United States Patent
Lin

(10) Patent No.: US 11,767,947 B2
(45) Date of Patent: Sep. 26, 2023

(54) SUPPORT LEG CONNECTING STRUCTURE FOR A TRIPOD

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 0 days.

(21) Appl. No.: 16/672,551

(22) Filed: Nov. 4, 2019

(65) Prior Publication Data

US 2021/0062964 A1  Mar. 4, 2021

(30) Foreign Application Priority Data

Aug. 26, 2019  (CN) .......................... 201921391948.9

(51) Int. Cl.
*F16M 11/24*  (2006.01)
*F16B 12/44*  (2006.01)

(52) U.S. Cl.
CPC ........... *F16M 11/245* (2013.01); *F16B 12/44* (2013.01); *F16B 2012/446* (2013.01)

(58) Field of Classification Search
CPC .... F16M 11/245; F16M 11/242; F16M 11/34; F16B 12/44; F16B 2012/446; A47B 3/002; A47B 2003/004; A47B 2003/006; A47B 2003/008; A47B 3/08; A47B 3/091; A47B 3/087; A47B 3/0911; A47B 3/0912; A47B 3/0913; A47B 3/0915; A47B 3/0916; A47B 3/0917; A47B 3/0918; E06C 7/423

See application file for complete search history.

(56) References Cited

U.S. PATENT DOCUMENTS

| | | | | |
|---|---|---|---|---|
| 755,403 A * | 3/1904 | Sipe | ....................... | F16M 11/28 248/171 |
| 1,289,047 A * | 12/1918 | Hall | .................... | A47B 3/0912 403/85 |
| 2,297,980 A * | 10/1942 | Perkins | ..................... | B25H 1/00 248/171 |
| 2,579,348 A * | 12/1951 | Taylor | .................... | F16M 11/08 108/4 |
| 3,091,249 A * | 5/1963 | O'Neil | ...................... | A45B 1/00 248/169 |
| 3,696,856 A * | 10/1972 | Potter | .................... | G03B 21/58 160/24 |

(Continued)

*Primary Examiner* — Christopher Garft
(74) *Attorney, Agent, or Firm* — LIN & ASSOCIATES INTELLECTUAL PROPERTY, INC.

(57) ABSTRACT

Provided is a support leg connecting structure for a tripod. The tripod includes a central tube, three support legs, three braces, and an upper tripod unit. The support leg connecting structure includes: a flat fixing portion formed at an appropriate portion of an outer wall of each of the support legs by pressing and recessing, and provided with a piercing hole; a recessed curved surface disposed between the flat fixing portion and an undeformed portion of the support leg; a curling portion formed on one end of each of the braces by curling, and having a through hole, the curling portion surrounding a periphery of the through hole; and a fastening part. The piercing hole corresponds to the through hole, the fastening part is inserted through the piercing hole and the through hole, the support leg and the brace are pivotally connected to each other around the fastening part.

5 Claims, 6 Drawing Sheets

(56) References Cited

U.S. PATENT DOCUMENTS

| | | | | |
|---|---|---|---|---|
| 6,113,040 A | * | 9/2000 | Yu | F16M 11/16 |
| | | | | 248/440.1 |
| 8,146,870 B1 | * | 4/2012 | Cooper | G10G 5/00 |
| | | | | 248/166 |
| 9,010,701 B1 | * | 4/2015 | Cooper | F16M 13/00 |
| | | | | 248/166 |
| 2004/0228133 A1 | * | 11/2004 | Tsao | F21V 21/06 |
| | | | | 362/418 |
| 2018/0059515 A1 | * | 3/2018 | Greenthal | F16M 11/08 |

* cited by examiner

SUPPORT LEG CONNECTING STRUCTURE FOR A TRIPOD

CROSS-REFERENCE TO RELATED APPLICATION

This application claims the priority of Chinese patent application No. 201921391948.9, filed on Aug. 26, 2019, which is incorporated herewith by reference.

BACKGROUND OF THE INVENTION

1. Field of the Invention

The present invention relates to a support leg connecting structure for a tripod, in particular to a support leg connecting structure for a tripod with three braces.

2. The Prior Arts

In the conventional support leg connecting structure for the tripod, the connecting structure of the three support legs and the three braces generally has two types: the first type is to fix the two ends of the braces to the support legs and the central tube, wherein the support legs and the central tube are located on the same side of the braces; and the second type is to connect the two ends of the braces to the support legs and the central tube through additional components.

In the first type of the conventional support leg connecting structure, the support legs and the central tube are provided with holes, and the braces are directly fixed to the holes of the support legs and the central tube by screws or rivets, without additional parts. The disadvantage thereof is that the support legs and the central tube are located on the same side of the braces, and when the support legs and the central tube are in the folding and unfolding action, the forces exerted on the braces are unbalanced, thereby causing the support leg connecting structure to be unstable.

In the second type of the conventional support leg connecting structure, the support legs and the central tube respectively are provided with connecting parts sleeved thereon, and both ends of the braces respectively are connected to the connecting parts through additional parts. Compared with the first type of the conventional support leg connecting structure, the lateral support of the support leg connecting structure is between the central tube and the support leg, thereby having better stability. The disadvantage thereof is that the additional parts increase the overall storage volume of the tripod, and are easy to cause problems, such as wasting more time in the manufacturing process or missing parts during maintenance.

SUMMARY OF THE INVENTION

In order to overcome the above-mentioned problems of the support leg connecting structure of the conventional tripod caused by increasing the product volume and additional parts, the present invention provides a support leg connecting structure for the tripod, an appropriate position of an outer wall of each of the support legs is pressed and recessed to form a flat fixing portion, the flat fixing portion is provided with a piercing hole, and one end of each of the braces is curled to form a curling portion and a through hole, the curling portion surrounds a periphery of the through hole, the piercing hole of the flat fixing portion corresponds to the through hole of the braces, the fastening part is inserted through the piercing hole and through hole, the support leg is pivotally connected to the supporting part. The support leg connecting structure for the tripod can avoid the problem caused by increasing the product volume and additional parts, and can increase the stability of the tripod.

The technical solution adopted by the present invention to solve the technical problem thereof is to provide a support leg connecting structure for a tripod, which includes a central tube, three support leg, three braces, and an upper tripod unit. The central tube inserts through the upper tripod unit, one end of the support legs are pivotally connected to the upper tripod unit, and the two ends of the braces are respectively pivotally connected to the support leg and the central tube. The support leg connecting structure comprises: a flat fixing portion formed at an appropriate position of the outer walls of each of the support legs by pressing and recessing, and provided with a piercing hole; a curling portion formed on one end of each of the braces by curling and having a through hole, the curling portion surrounding a periphery of the through hole; and a fastening part. The piercing hole of the flat fixing portion corresponds to the through hole of the curling portion, the fastening part is inserted through the piercing hole and the through hole, the support leg and the brace are pivotally connected to each other around the fastening part.

Preferably, the curling portion of the brace is provided with a notch, which separates the through hole of the curling portion into two separated through holes, the flat fixing portion is embedded in the notch, the piercing hole of the flat fixing portion corresponds to the two separated through hole, the fastening part is inserted through the piercing hole and the two separated through holes, the support leg and the brace are pivotally connected to each other around the fastening part.

Preferably, a recessed curved surface is formed between the flat fixing portion and an undeformed portion of the support leg. The recessed curved surface is an oval shape.

Preferably, the flat fixing portion is a water drop shape.

Preferably, the flat fixing portion is formed with a protrusion portion.

According to the present invention, the support leg is pivotally connected to the brace by the fastening part, which is inserted through the piercing hole of the flat fixing portion and the through hole of the curling portion. Therefore, the present invention has the benefit of effectively avoiding the problem caused by increasing the product volume and additional parts.

BRIEF DESCRIPTION OF THE DRAWINGS

The present invention will be further described below in conjunction with the accompanying drawings and embodiments.

DETAILED DESCRIPTION OF THE PREFERRED EMBODIMENT

Figure 1:
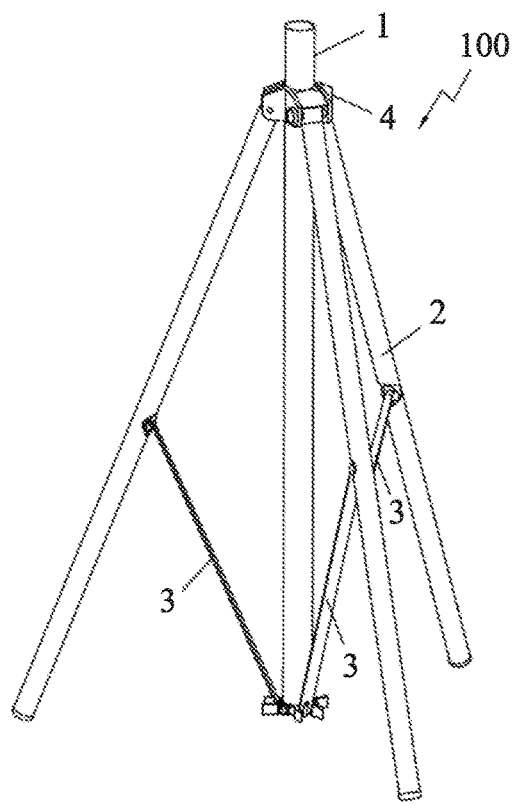
FIG. 1 is a schematic view showing the unfolded state of the first embodiment of the present invention.

Implementations of the present invention will be described below according to FIGS. 1 to 5. The description is not intended to limit the implementation of the present invention, but is one of the embodiments of the present invention.

FIG. 1 to FIG. 3C illustrate the support leg connecting structure for the tripod 100 according to the first embodiment of the present invention. The tripod 100 includes a central tube 1, three support legs 2, three braces 3, and an upper tripod unit 4. The central tube 1 is inserted through the upper tripod unit 4, one end of the support leg 2 is pivotally connected to the upper tripod unit 4, and the two ends of the brace 3 are respectively pivotally connected to the support leg 2 and the central tube 1. The support leg connecting structure comprises: a flat fixing portion 21 formed at an appropriate portion of the outer walls of each of the support legs 2 by pressing and recessing, and provided with a piercing hole 211; a recessed curved surface 22 formed between the flat fixing portion 21 and an undeformed portion of the support leg 2 and extending toward both ends of the support leg 2 to absorb the push or pull force on the support leg 2 when the flat fixing portion 21 is formed, so that the support leg 2 keeps an undeformed portion at any one of cross sections of the periphery of the flat fixing portion 21, thereby preventing the strength of the support leg 2 from being affected by over-deformation; and a curling portion 31 formed on one end of each of the braces 3 by curling having a through hole 32, the curling portion 31 surrounding the periphery of the through hole 32; and a fastening part S. The piercing hole 211 of the flat fixing portion 21 corresponds to the through hole 32 of the curling portion 31, the fastening part S is inserted through the piercing hole 211 and the through hole 32, the support leg 2 and the brace 3 are pivotally connected to each other around the fastening part S. The fastening part S of the present embodiment is a set of screw and nut, and may also be a pull-rivet or a rivet.

Figure 2:
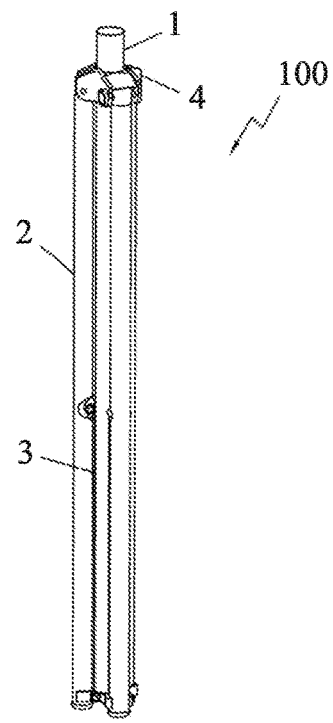
FIG. 2 is a schematic view showing the folded state of the first embodiment of the present invention.

FIG. 1 and FIG. 2 are schematic views of the unfolded state and the folded state of the support leg connecting structure for the tripod 100 according to the first embodiment of the present invention. Between an unfolded state and the folded state, each of the support legs 2 and each of the braces 3 are pivotally connected to each other around each of the fastening parts S.

Figure 3A:
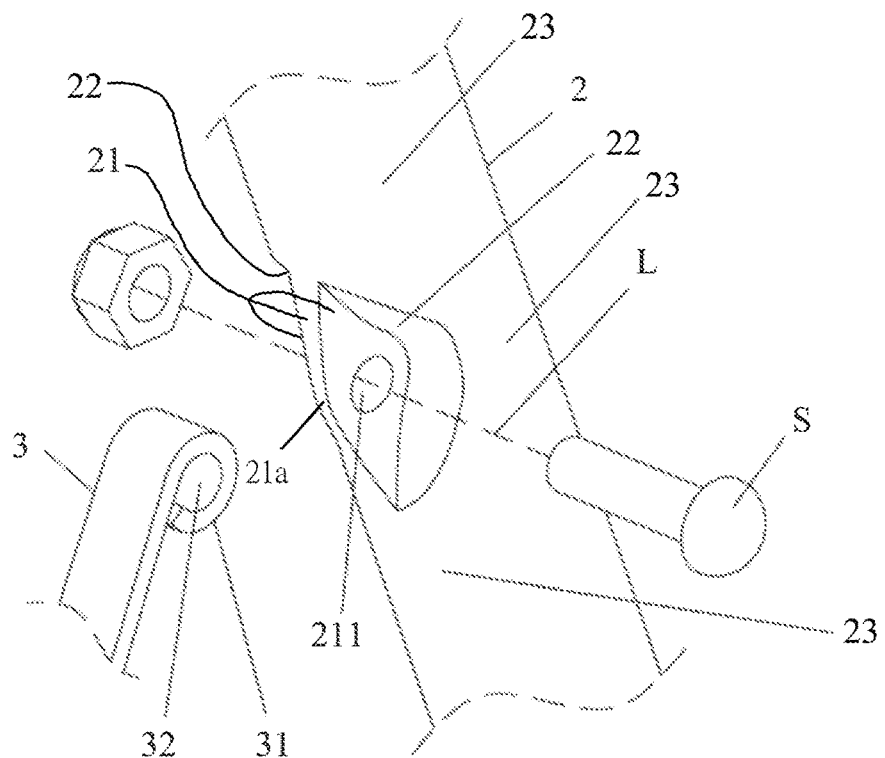
FIG. 3A is a partially exploded schematic view of the support leg and the brace of the first embodiment of the present invention.
Figure 3B:
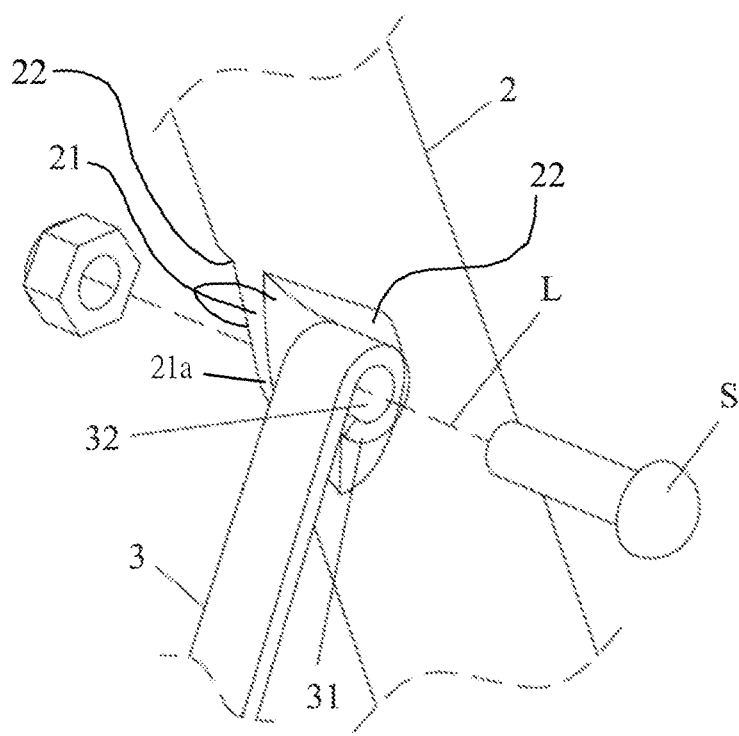
FIG. 3B is a schematic view of the support leg and the brace of the first embodiment of the present invention before partial assembling.
Figure 3C:
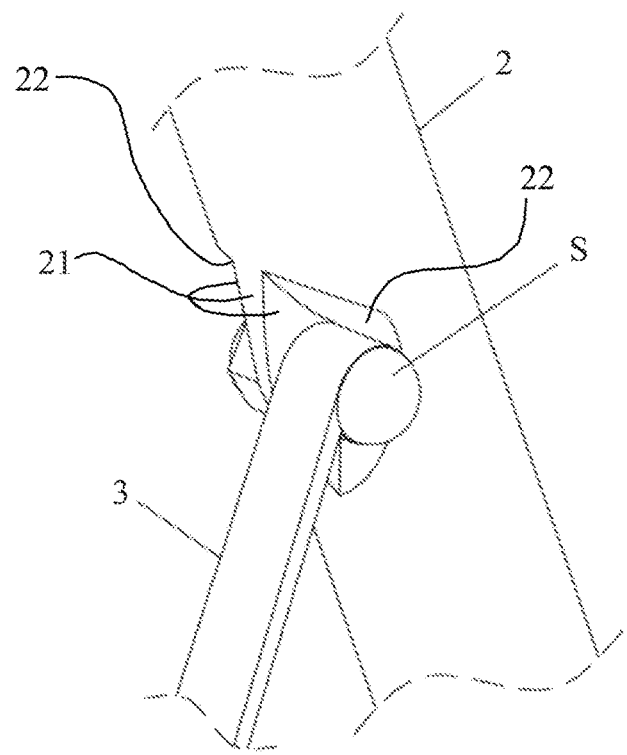
FIG. 3C is a schematic view of the support leg and the brace of the first embodiment of the present invention after partial assembling.

FIG. 3A to FIG. 3C respectively are a partially exploded view, a schematic view before partial assembling, and a schematic view after partial assembling of the support leg and the brace of the first embodiment. As shown in FIG. 3A of the present embodiment, the flat fixing portion 21 is formed on an appropriate portion of an outer wall of each of the support legs 2 by pressing and recessing. The flat fixing portion 21 is provided with a piercing hole 211, and the curling portion 31 is formed on one end of each of the braces 3 by curling. The curling portion 31 has a through hole 32, and the curling portion 31 surrounds the periphery of the through hole 32. As shown in FIG. 3B of the present embodiment, the piercing hole 211 of the flat fixing portion 21 corresponds to the through hole 32 of the curling portion 31. As shown in FIG. 3C of the present embodiment, the fastening part S is inserted through the piercing hole 211 and the through hole 32 along a pivot axis L, and the support leg 2 and the brace 3 are pivotally connected to each other around the fastening part S.

Figure 4A:
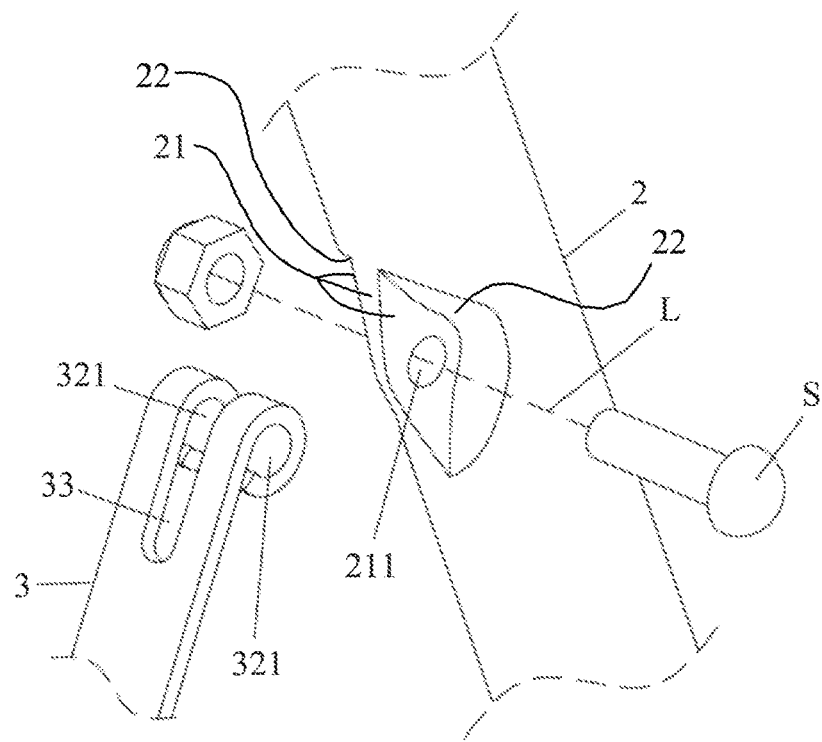
FIG. 4A is a partially exploded schematic view of the support leg and the brace of the second embodiment of the present invention.
Figure 4B:
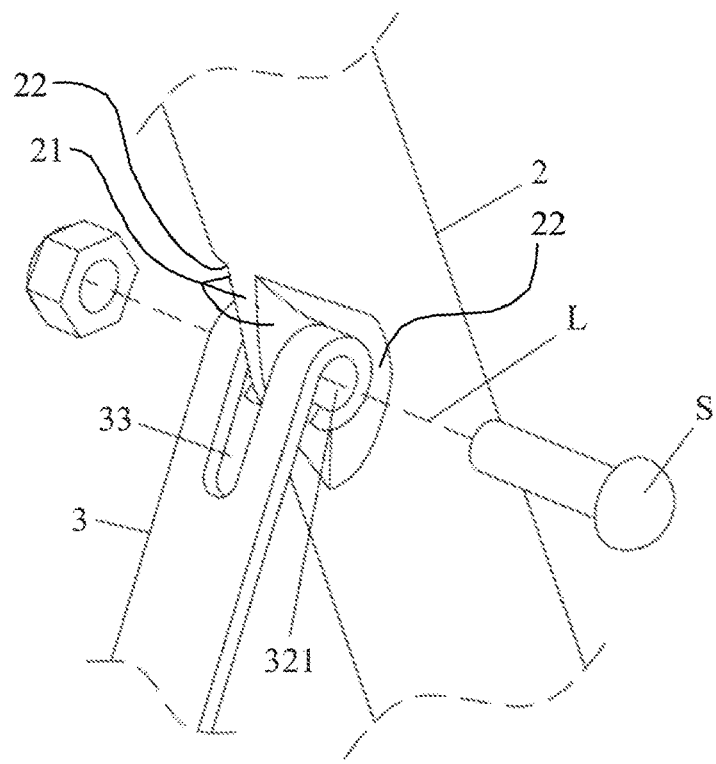
FIG. 4B is a schematic view of the support leg and the brace of the second embodiment of the present invention before partial assembling.
Figure 4C:
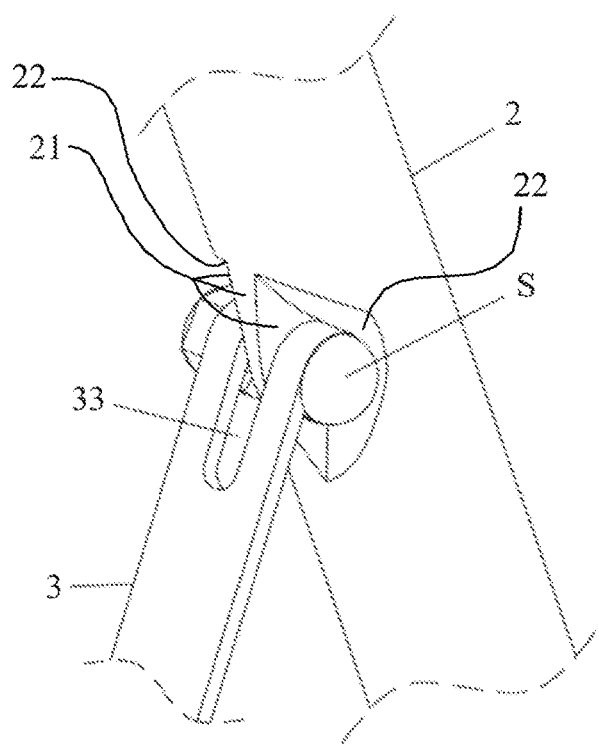
FIG. 4C is a schematic view of the support leg and the brace of the second embodiment of the present invention after partial assembling.

Preferably, FIG. 4A to FIG. 4C respectively are a partially exploded view, a schematic view before partial assembling, and a schematic view after partial assembling of the support leg and the brace of the second embodiment. As shown in FIG. 4A of the present embodiment, the curling portion of the brace is provided with a notch 33, which separates the through hole 32 of the curling portion 31 into two separated through holes 321. As shown in FIG. 4B of the embodiment, the flat fixing portion 21 is embedded in the notch 33, and the piercing hole 211 of the flat fixing portion 21 corresponds to the two separated through holes 321. As shown in FIG. 4C of the present embodiment, the fastening part S is inserted through the piercing hole 211 and the two separated through holes 321 along a pivot axis L, the support leg 2 and the brace 3 are pivotally connected to each other around the fastening part S. The present embodiment can increase the stability of the support leg connecting structure.

Figure 5:
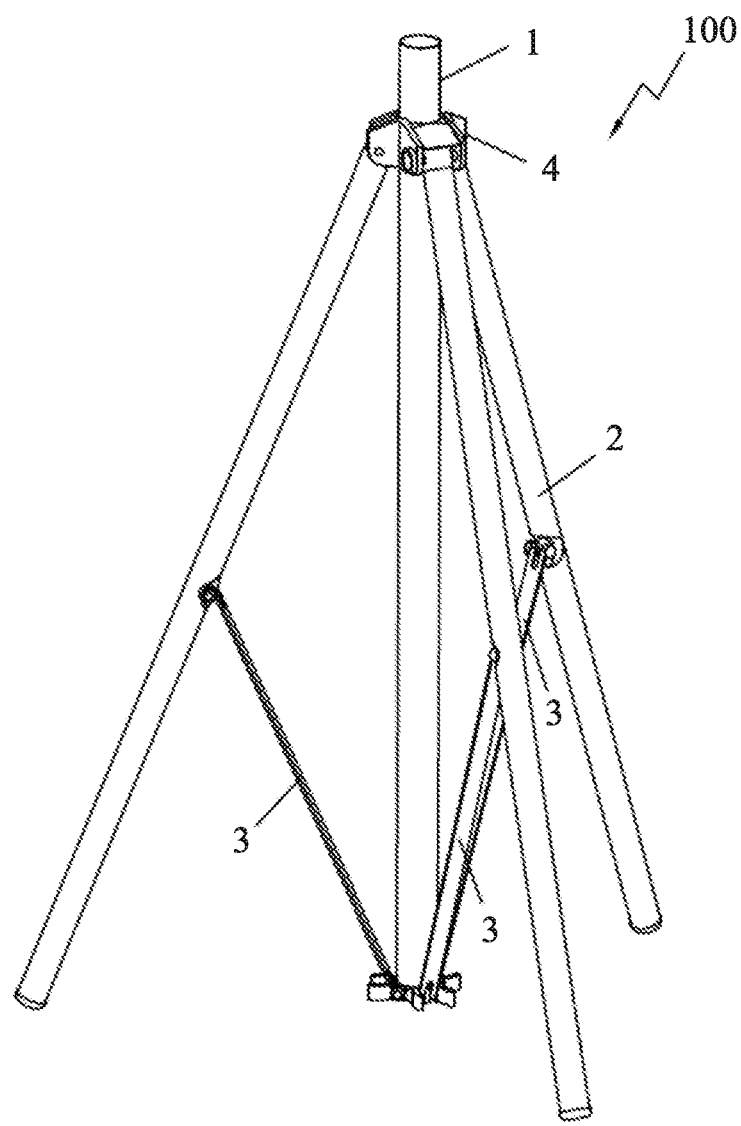
FIG. 5 is a schematic view of the unfolded state of the second embodiment of the present invention.

FIG. 5 is a schematic view of the unfolded state of the support leg connecting structure for the tripod 100 according to the second embodiment. In the unfolded state, each of the support legs 2 and each of the braces 3 are pivotally connected to each other around each of the fastening parts S.

Figure 6A:
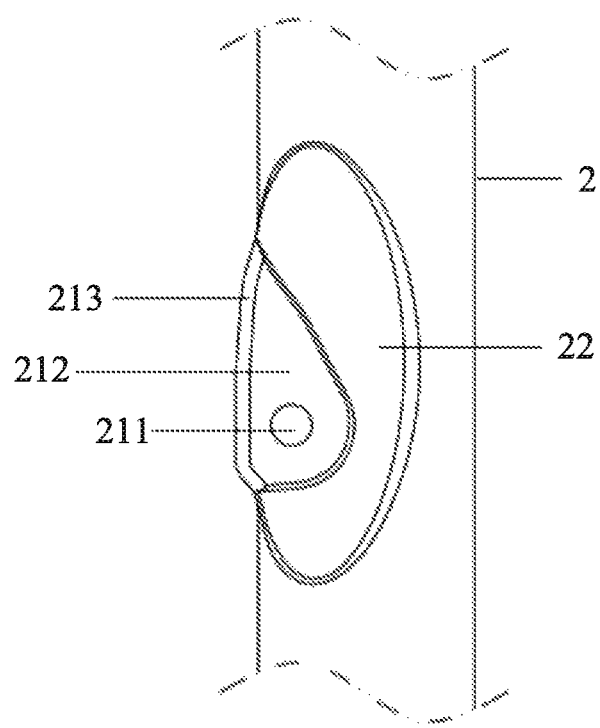
FIG. 6A is a partial schematic view of the support leg of the third embodiment of the present invention.

As can be seen in FIGS. 3A, 4A and 6A, the flat fixing portion 21 is in a deformed portion formed on one side of the tubular outer wall between upper and lower ends of the support leg 2, and the deformed portion is surrounded by an undeformed portion 23 of the tubular outer wall of the support leg 2, wherein a portion of the tubular outer wall located on an opposite side of the deformed portion remains undeformed as a part of the undeformed portion 23 for supporting the deformed portion. Two recessed curved surfaces 22 are formed in the deformed portion, recessed from the tubular outer wall at two opposite sides of the flat fixing portion 21 respectively between the flat fixing portion 21 and the undeformed portion. As can be seen from FIGS. 3A, 4A and 5, the two recessed curved surfaces are separated by the flat fixing portion 21. The undeformed portion of the tubular outer wall of the support leg 2 extends longitudinally from the recessed curved surfaces 22 towards both ends of the support leg 2. Each recessed curved surface 22 being located on one side of the flat fixing portion 21 extends outward from the flat fixing portion 21 to the undeformed portion 23 of the tubular outer wall. It should be noted that at the position of the flat fixing portion 21, the tubular outer wall of the support leg 2 is only recessed on one side and the tubular outer wall on the opposite side of the flat fixing portion 21 is undeformed to keep the strength of the support leg 2. As illustrated in FIG. 3A, the deformed portion, including the flat fixing portion 21 and the two recessed curved surfaces 22, is an integral part of the tubular outer wall and the flat fixing portion 21 has a ridge 21a integrally transitioned to the undeformed portion 23 of the tubular outer wall in both directions of the upper and lower ends of the support leg 2. As shown in FIG. 6A of the third embodiment, the recessed curved surface 22 is an oval shape. The recessed curved surface 22 of the present invention may also be other shapes, such as a butterfly wing shape.

As shown in FIG. 6A, the flat fixing portion 21 is a water drop shape 212, and the curvature of the water drop shape 212 can determine the pivoting angle of the brace 3.

Figure 6B:
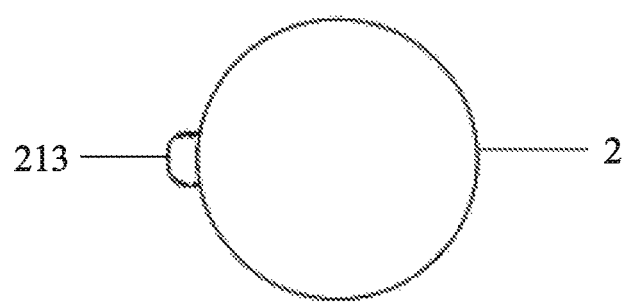
FIG. 6B is a bottom schematic view of the support leg of the third embodiment of the present invention.

As shown in FIG. 6A and FIG. 6B, the flat fixing portion 21 is formed with a protrusion portion 213 extending outwardly therefrom, so that the piercing hole 211 can be disposed closer to the outer edge of the support leg 2 and the support leg 2 remains more undeformed portions to increase the strength of the support leg connecting structure of the present invention.

The above description and illustration are only used to illustrate the preferred embodiment of the present invention. Those skilled in the art may make other modifications in accordance with the scope of the claim defined below and the above description, but the modifications should still be included in the scope of the present invention.

What is claimed is:

1. A support leg connecting structure for a tripod, the tripod comprising a central tube, three support legs, three braces, and an upper tripod unit, the central tube inserting through the upper tripod unit, one end of each support leg pivotally connected to the upper tripod unit, and two ends of each of the braces respectively pivotally connected to the support leg and the central tube, the support leg connecting structure comprising:
   a flat fixing portion formed in a deformed portion of one side of a tubular outer wall between upper and lower ends of each support leg by pressing and recessing, and provided with a piercing hole, the deformed portion being surrounded by an undeformed portion of the tubular outer wall of the support leg, a portion of the tubular outer wall located on an opposite side of the deformed portion being undeformed as a part of the undeformed portion for supporting the deformed portion;
   two recessed curved surfaces formed in the deformed portion and recessed from the tubular outer wall at two opposite sides of the flat fixing portion respectively between the flat fixing portion and the undeformed portion, the undeformed portion extending longitudinally from the recessed curved surfaces toward both upper and lower ends of the support leg, the two recessed curved surfaces being separated by the flat fixing portion, and each recessed curved surface being located on one side of the flat fixing portion and extending outward from the flat fixing portion to the undeformed portion of the tubular outer wall of the support leg;
   a curling portion formed on one end of each of the braces by curling, and having a through hole, the curling portion surrounding a periphery of the through hole; and
   a fastening part;
   wherein the deformed portion, including the flat fixing portion and the two recessed curved surfaces, is an integral part of the tubular outer wall, the flat fixing portion has a ridge integrally transitioned to the undeformed portion of the tubular outer wall in both directions of the upper and lower ends of the support leg, the piercing hole of the flat fixing portion corresponds to the through hole of the curling portion, the fastening part is inserted through the piercing hole and the through hole, and the support leg and the brace are pivotally connected to each other around the fastening part.

2. The support leg connecting structure of claim 1, wherein the curling portion of the brace is provided with a notch, which separates the through hole into two separated through holes, the flat fixing portion is embedded in the notch, the piercing hole of the flat fixing portion corresponds to the two separated through holes, the fastening part is inserted through the piercing hole and the two separated through holes, the support leg and the brace are pivotally connected to each other around the fastening part.

3. The support leg connecting structure of claim 1, wherein the recessed curved surface is an oval shape.

4. The support leg connecting structure of claim 1, wherein the flat fixing portion is a water drop shape.

5. The support leg connecting structure of claim 1, wherein the flat fixing portion is formed with a protrusion portion.

* * * * *